US006223433B1

(12) United States Patent
Knecht

(10) Patent No.: US 6,223,433 B1
(45) Date of Patent: May 1, 2001

(54) DUAL-FLUID HEAT-EXCHANGING SYSTEM WITH EXTRUDED THERMAL-TRANSFER CORE AND METHOD OF FABRICATION THEREOF

(75) Inventor: John W. Knecht, Murfreesboro, TN (US)

(73) Assignee: Calsonic N.A. Inc., Phoenix, AZ (US)

( * ) Notice: Subject to any disclaimer, the term of this patent is extended or adjusted under 35 U.S.C. 154(b) by 0 days.

(21) Appl. No.: 09/200,380

(22) Filed: Nov. 24, 1998

(51) Int. Cl.$^7$ .................................................. B23P 15/26
(52) U.S. Cl. ........................... 29/890.03; 29/890.054
(58) Field of Search ............................. 29/890.03, 428, 29/890.054; 165/104.14; 228/183

(56) References Cited

U.S. PATENT DOCUMENTS

| 4,903,760 | 2/1990 | Joshi et al. ........................ 165/41 |
| 5,509,199 | * 4/1996 | Beamer et al. ................... 29/890.03 |
| 5,590,709 | * 1/1997 | Tajima et al. .................... 29/890.03 |

* cited by examiner

Primary Examiner—I Cuda Rosenbaum
(74) Attorney, Agent, or Firm—Jordan M. Meschkow; Lowell W. Gresham; Meschkow & Gresham P.L.C.

(57) ABSTRACT

A dual-fluid heat-exchanging system (20) incorporating a primary heat exchanger (22) and a secondary heat exchanger (24) is provided. The primary heat exchanger (22) incorporates a core (40) configured to extract heat (32) from a primary fluid (34). An input tank (30) and an output tank (28) are coupled to the primary-exchanger core (40) and function as reservoirs of the primary fluid (34) and as manifolds routing the primary fluid (34) through the core (40). The secondary heat exchanger (24) incorporates an extruded metal core (26) coupled to the primary-exchanger input tank (30) or the primary-exchanger output tank (28) and configured to transfer heat (32) from a secondary fluid (52) into the primary fluid (34) within the primary-exchanger input tank (30) or output tank (28). An input manifold (62) and an output manifold (64) are coupled to the secondary-exchanger core (26) and route the secondary fluid (52) through the core (26). The secondary-exchanger core (26) may be extruded of either a cupriferous or an aluminiferous metal, and may be extruded with or brazed to the primary-exchanger input tank (30) or output tank (28).

11 Claims, 2 Drawing Sheets

DUAL-FLUID HEAT-EXCHANGING SYSTEM WITH EXTRUDED THERMAL-TRANSFER CORE AND METHOD OF FABRICATION THEREOF

TECHNICAL FIELD OF THE INVENTION

The present invention relates generally to the field of fluid heat-exchanging systems. More specifically, the present invention relates to the field of dual-fluid heat-exchanging systems having extruded thermal-transfer cores.

BACKGROUND OF THE INVENTION

The use of fluid heat exchangers is commonplace where heat is to be extracted from a fluid. Single-fluid heat-exchanging systems generally employ a cooling core to extract heat from the fluid. The heat extracted from the fluid is passed, primarily through convection, to the surrounding atmosphere. Conventional automotive radiators and heaters are exemplary of single-fluid heat-exchanging systems. The single fluid to be cooled is typically automotive antifreeze.

In many cases, a second fluid is also to be cooled. Such dual-fluid heat-exchanging systems often employ a thermal-transfer unit to extract heat from the second fluid and pass that heat, primarily through convection and conduction, to the first fluid. The cooling of the first fluid, therefore, provides the cooling of the second fluid. A conventional automotive radiator incorporating an oil cooler is exemplary of such a dual-fluid heat-exchanging system. The first fluid to be cooled is typically automotive antifreeze and the second fluid to be cooled is typically automatic transmission oil, engine oil, or the like.

Numerous problems arise with conventional dual-fluid heat-exchanging systems. To better understand these problems, the operation of a dual-fluid heat-exchanging system will briefly be covered. For purposes of discussion, a dual-fluid automotive heat-exchanging system incorporating a radiator configured to extract heat from an automotive engine by means of a coolant (water or antifreeze), and an oil cooler configured to extract heat from an automotive transmission by means of a transmission oil is presumed.

A typical radiator is made up of an input tank, a cooling core, and an output tank. The input tank serves both as a coolant reservoir and as a manifold configured to route the coolant from the engine to the cooling core. Similarly, the output tank serves both as a coolant reservoir and as a manifold configured to route the coolant from the cooling core back to the engine. The cooling core is made up of a multitude of thin-walled, thermally conductive tubes connected to a multitude of thermally conductive "radiating fins."

In operation, the coolant absorbs heat from the engine. The heated coolant then passes from the engine into the input tank and thence into the cooling core. As the coolant passes through the cooling core, the heat contained in the coolant is conducted through the thin-walled tubes and into the radiating fins. The heat passes thence into the air, where it is dissipated by convection. The cooled coolant then passes from the cooling core into the output tank and thence into the engine, completing the cycle.

A typical radiator-coupled oil cooler is similar in construction and operation. The oil cooler is made up of an input manifold or reservoir, a thermal-transfer core, and an output manifold or reservoir. The thermal-transfer core is made up of thin-walled, thermally conductive tube(s). The core or, often, the entire oil cooler is embedded within one of the radiator tanks, hence surrounded at all times by the coolant.

In operation, the oil absorbs heat from the automotive transmission. The heated oil then passes from the transmission into the input manifold or reservoir, and thence into the thermal-transfer core. As the oil passes through the thermal-transfer core, the heat contained in the oil is conducted through the thin-walled tube(s) and into the coolant, where it is dissipated by convection. The cooled oil then passes from the thermal-transfer core into the output manifold or reservoir, and thence into the transmission, completing the cycle.

A potential problem exists in the materials from which the various components of the heat-exchanging system are fabricated. For the radiator core, a material such as a cupriferous or aluminiferous metal is preferred. Such metals are easily cast or machined, possess sufficient strength, and exhibit excellent thermal conductivity and transfer characteristics. Components fabricated of cupriferous metals have the additional advantage of being readily assembled through soldering, brazing, etc. However, components fabricated of aluminiferous metals may be clad with a suitable alloy to provide this capability.

The radiator input and/or output tanks, serving as reservoirs and manifolds only, do not share the thermal characteristic requirements of the cooling-core components. The tanks, therefore, need not be fabricated of the same materials nor in the same manner as the cooling core. They therefore may be fabricated of inexpensive metals, plastics, resins, or other materials.

The oil cooler is typically an independent assembly fitted into one of the radiator tanks. It is the task of the oil cooler core to transfer heat from the transmission oil to the coolant. The efficiency of this thermal transfer is a function of two basic factors, the inter-fluid interface area and the thermal conductivity of the material separating the transmission oil from the coolant. The same thermal transfer may be realized by a core having a small inter-fluid interface area and a high thermal conductivity as a core having a large inter-fluid interface area and a low thermal conductivity. In other words, a small oil cooler fabricated of a cupriferous metal may have substantially the same thermal transfer characteristics as a large oil cooler fabricated of resin.

Since different components of a dual-fluid heat-exchanging system have different requirements, dissimilar materials are often used. Wherever dissimilar materials come into contact, an interface problem exists. For example, an aluminiferous metal cooling core may be used with resin input and output tanks and a cupriferous metal oil cooler. The differences in thermal expansion of the differing materials cause a significant thermal stress at inter-material interfaces. This thermal stress in turn creates a potential for leakage. Partial compensation for this thermal stress is conventionally provided by the use of seals, gaskets, etc. These seals, gaskets, etc., are subject to decomposition, vibrational wear, drying out, or other degeneration producing a limited life-span and a significant reduction in the reliability of the heat-exchanging system.

A related problem exists in that the use of seals, gaskets, etc., creates a complex assembly. The fabrication of such an assembly requires multiple operations, resulting in a high fabrication cost.

The fabrication of an oil cooler from plastic or resin, while offering an economy of manufacture, requires that the oil cooler be substantially larger than one fabricated of metal. Since the oil cooler is conventionally embedded within a radiator tank, a plastic or resin oil cooler requires that the radiator tank be significantly larger than otherwise.

This presents a problem in scale, wherein a larger-than-otherwise radiator tank implies a larger than otherwise radiator overall, and a less flexible usage, e.g., requires a larger car hood, etc.

Both the thermal-stress and scale problems may be addressed by fabricating all components of substantially the same material, i.e., of a cupriferous or clad aluminiferous metal. In such a case, a problem remains in that conventional manufacturing techniques still dictate the use of seals, gaskets, etc., as described hereinabove. Therefore, the problems of complexity of structure, difficulty of manufacture, and cost of manufacture remain.

What is needed, therefore, is a methodology of manufacturing a dual-fluid heat-exchanging system that eliminates the use of seals, gaskets, etc., between components of the system.

What is needed is a methodology of manufacturing a dual-fluid heat-exchanging system offering a substantial decrease in complexity over conventional methodologies.

What is needed is a dual-fluid heat-exchanging system wherein all major components thereof are fabricated from substantially the same material.

What is needed is a dual-fluid heat-exchanging system wherein that material is a cupriferous metal or an aluminiferous metal.

What is needed is a dual-fluid heat-exchanging system wherein the secondary-exchanger thermal-transfer core presents a significant inter-fluid surface to both the primary and secondary fluid so as to facilitate the transfer of heat from the secondary fluid to the primary fluid.

What is needed is a dual-fluid heat-exchanging system offering a substantial overall reduction in cost over current systems.

SUMMARY OF THE INVENTION

Accordingly, it is an advantage of the present invention that a dual-fluid heat-exchanging system with an extruded thermal-transfer core and a method of fabrication thereof is provided.

It is another advantage of the present invention that a methodology is provided for the manufacture of a dual-fluid heat-exchanging system that eliminates seals, gaskets, etc., between components of the primary and secondary heat exchangers.

It is another advantage of the present invention that a simplified methodology of manufacture for a dual-fluid heat-exchanging system is provided.

It is another advantage of the present invention that a dual-fluid heat-exchanging system is provided wherein all components are fabricated from a cupriferous metal or an aluminiferous metal.

It is another advantage of the present invention that a dual-fluid heat-exchanging system is provided that offers a significantly larger inter-fluid area between the primary and secondary heat exchangers than conventional systems.

It is another advantage of the present invention that a methodology of producing a dual-fluid heat-exchanging system having a significant reduction in production costs over conventional systems is provided.

The above and other advantages of the present invention are realized in one form by a dual-fluid heat-exchanging system configured to extract heat from a primary fluid and a secondary fluid, wherein the heat-exchanging system incorporates a primary heat exchanger comprising a primary-exchanger core configured to extract heat from the primary fluid, and a secondary heat exchanger comprising a secondary-exchanger core formed of an extruded metal and configured to transfer heat from the secondary fluid to the primary fluid.

The above and other advantages of the present invention are also realized by a method for the fabrication of a thermal-transfer unit for a dual-fluid heat-exchanging system, wherein the method comprises the extrusion of a metal thermal-transfer core for a secondary heat exchanger of the dual-fluid heat-exchanging system, the production of a thermal-transfer tank for a primary heat exchanger of the dual-fluid heat-exchanging system, and the combination of the thermal-transfer core and the thermal-transfer tank to produce the thermal-transfer unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
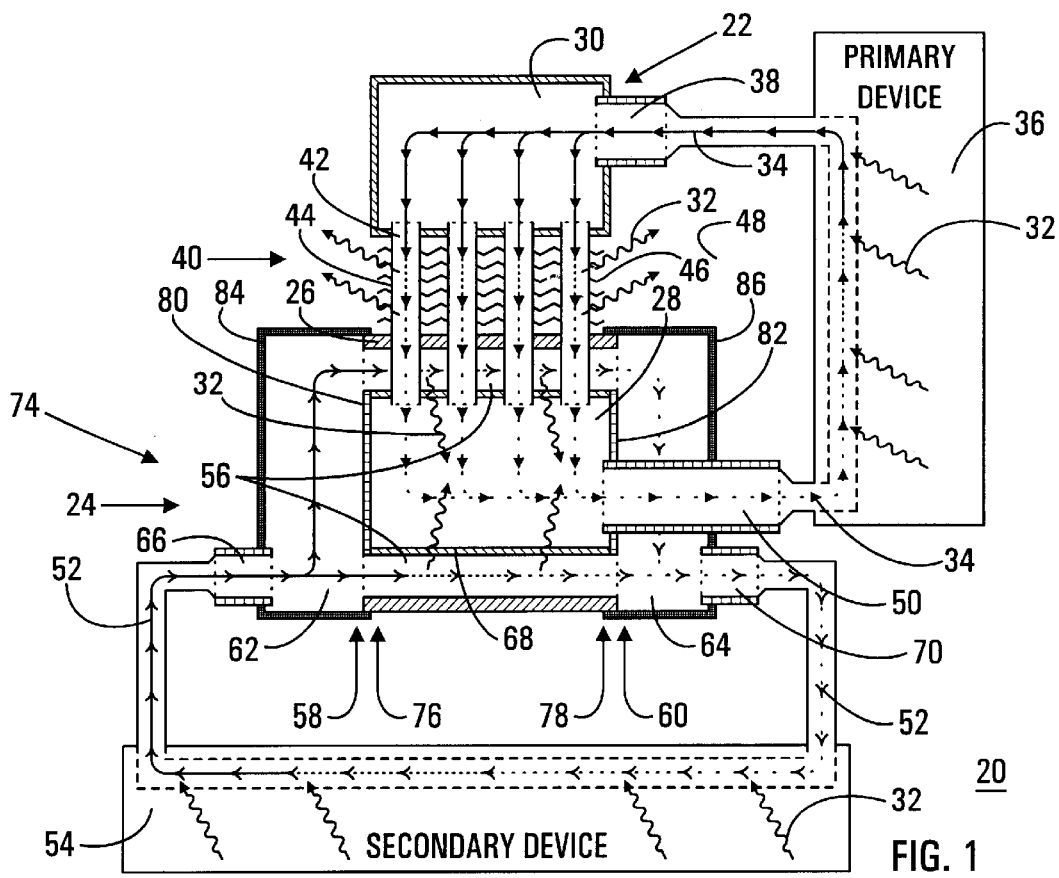
FIG. 1 depicts a schematic representation of a dual-fluid heat-exchanging system incorporating a primary heat exchanger and a double-ended secondary heat exchanger in accordance with a preferred embodiment of the present invention.
Figure 2:
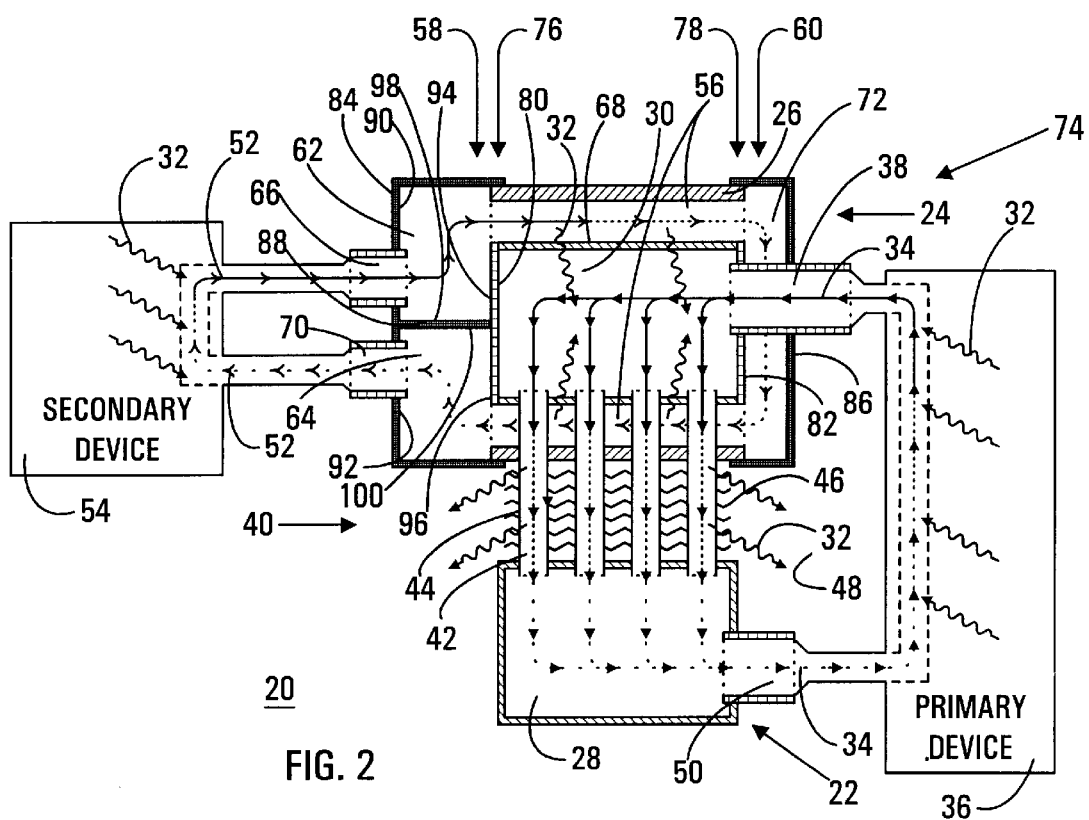
FIG. 2 depicts a schematic representation of a dual-fluid heat-exchanging system incorporating a primary heat exchanger and a single-ended secondary heat exchanger in accordance with an alternative preferred embodiment of the present invention.

FIG. 1 depicts a schematic representation of a dual-fluid heat-exchanging system 20 incorporating a primary heat exchanger 22 and a double-ended secondary heat exchanger 24 having a secondary-exchanger core 26 coupled with a primary-exchanger output tank 28 in accordance with a preferred embodiment of the present invention. FIG. 2 depicts a schematic representation of dual-fluid heat-exchanging system 20 incorporating primary heat exchanger 22 and a single-ended secondary heat exchanger 24 having secondary-exchanger core 26 coupled with a primary-exchanger input tank 30 in accordance with an alternative preferred embodiment of the present invention. The following discussion refers to FIGS. 1 and 2.

In dual-fluid heat-exchanging system 20, primary heat exchanger 22 extracts heat 32 from a primary fluid 34, thus extracting heat from a primary device 36 within which primary fluid 34 absorbs heat 32. Primary fluid 34 flows from primary device 36 into input tank 30 via an input port 38. Input tank 30 serves as a reservoir for primary fluid 34 and as an input manifold for a primary-exchanger core 40. Primary fluid 34 passes from input tank 30 to core 40. In core 40, primary fluid 34 loses heat 32 as it flows through a plurality of primary-core tubes 42. Heat 32 is conducted from primary fluid 34, through tube walls 44, to primary-core heat-dissipation fins 46, to the surrounding air 48, thence to be dissipated by convection. Primary fluid 34 then passes from core 40 to output tank 28. Output tank 28 serves as a reservoir for primary fluid 34 and as an output manifold for core 40. Primary fluid 34 passes out of output tank 28 via an output port 50, and flows back to primary device 36 to complete the cycle.

In dual-fluid heat-exchanging system 20, secondary heat exchanger 24 extracts heat 32 from a secondary fluid 52, thus extracting heat from a secondary device 54 within which secondary fluid 52 absorbs heat 32. Secondary heat exchanger 24 may be double-ended (FIG. 1) or single-ended (FIG. 2).

In a double-ended implementation of secondary heat exchanger 24 (FIG. 1), secondary-exchanger core 26 is formed of an extruded metal and has at least one longitudinal chamber 56 formed during extrusion and configured to pass secondary fluid through core 26 from a first (input) core end 58 to a second (output) core end 60. Core 26 is coupled to an input manifold. 62 located proximate input core end 58 and an output manifold 64 located proximate output core end 60. Secondary fluid 52 flows into input manifold 62 via an input port 66. Secondary fluid 52 passes through secondary-exchanger core 26 from input manifold 62 to output manifold 64 via longitudinal chamber(s) 56. As secondary fluid 52 flows through longitudinal chamber(s) 56, heat 32 is transferred from secondary fluid 52 to primary fluid 34. Heat 32 is conducted from secondary fluid 52, through a tank wall 68 and into one of primary-exchanger input tank 28 or output tank 30, into primary fluid 34 contained therein, and thence dissipated by convection. Secondary fluid 52 then passes out of output manifold 64 via an output port 70, and flows back to secondary device 54 to complete the cycle.

In a single-ended implementation of secondary heat exchanger 24 (FIG. 2), secondary-exchanger core 26 is formed of an extruded metal and has at least two longitudinal chambers 56 formed during extrusion. At least one of longitudinal chambers 56 is configured to pass secondary fluid 52 through core 26 in a forward direction from first (i/o) core end 58 to second (inter-chamber) core end 60. Similarly, at least one of longitudinal chambers 56 is configured to pass secondary fluid 52 in a reverse direction from inter-chamber core end 60 to i/o core end 58. Core 26 is coupled to input manifold 62 located proximate i/o core end 58, an inter-chamber manifold 72 located proximate inter-chamber core end 60, and output manifold 64 located proximate i/o core end 60. Secondary fluid 52 flows from secondary device 54 into input manifold 62 via input port 66. Secondary fluid 52 passes through secondary-exchanger core 26 from input manifold 62 to output manifold 64 via forward-direction one(s) of longitudinal chamber(s) 56, inter-chamber manifold 72, and reverse-direction one(s) of longitudinal chamber(s) 56. As secondary fluid 52 flows through longitudinal chambers 56 in a forward, a reverse, or both directions, depending upon the configurations thereof, heat 32 is transferred from secondary fluid 52 to primary fluid 34. Heat 32 is conducted from secondary fluid 52, through tank wall 68 and into one of primary-exchanger input tank 28 or output tank 30, into primary fluid 34 contained therein, and thence dissipated by convection.

Secondary fluid 52 then passes out of output manifold 64 via output port 70, and flows back to secondary device 54 to complete the cycle.

In the preferred embodiment, secondary-exchanger core 26 is coupled with primary-exchanger output tank 28 (FIG. 1) to form a thermal-transfer unit 74. Those skilled in the art will appreciate that there may be conditions (e.g., mounting considerations) under which it is desirable to couple secondary-exchanger core 26 with primary-exchanger input tank 30 (FIG. 2). However, since heat 32 is extracted from primary fluid 34 between input tank 30 and output tank 28, input tank 30 contains primary fluid 34 at a higher temperature than does output tank 28. Hence, there is a greater temperature differential between secondary fluid 52 and primary fluid 34 contained in output tank 28. It is, therefore, generally more desirable to couple secondary-exchanger core 26 with output tank 28. This discussion presumes hereinafter that thermal-transfer unit 74 is made up of secondary-exchanger core 26, hereinbelow thermal-transfer core 26, coupled with primary-exchanger output tank 28, hereinbelow thermal-transfer tank 28, unless otherwise indicated.

In the preferred fabrication of thermal-transfer unit 74, thermal-transfer tank 28 is produced. Tank 28 is substantially tank wall 68 formed into a cylindrical or prismoidal shape. Primary-exchanger core 40 is affixed to a long side of tank wall 68. Each primary-core tube 42 pierces tank wall 68, allowing free passage of primary fluid 34 between primary-exchanger core 40 and tank 28.

Thermal-transfer tank 28 may be fabricated as an end-port tank, wherein primary-fluid port 50 is formed to come off an end of tank 28 (FIG. 1). In an end-port configuration, tank 28 has a first (closed) tank end 76 and a second (open) tank end 78. Closed tank end 76 is formed by affixing a closed tank cap 80 to an end of tank wall 68. Closed tank cap 80 is configured as a blind cap, thus closing off that end of tank wall 68. Open tank end 78 is formed by affixing an open tank cap 82 to an end of tank wall 68 opposite closed tank end 76 and forming primary-fluid port 50 through open-end tank cap 82.

Thermal-transfer tank 28 may also be fabricated as a side-port tank, wherein primary-fluid port 50 is formed to come off a side of tank 28 (not shown). In a side-port configuration, first and second tank ends 76 and 78 are both closed by affixing closed tank caps 80 to the ends of tank wall 68. Primary-fluid port 50 is formed through tank wall 68 proximate one of tank ends 76 and 78.

Those skilled in the art will appreciate that the fabrication of thermal-transfer tank 28 (i.e., primary-exchanger output tank 28) is a part of the fabrication of primary heat exchanger 22 itself and would not normally be divorced therefrom.

As described hereinabove, secondary heat exchanger 24 may be double ended (FIG. 1) or single ended (FIG. 2). In the fabrication of a double-ended embodiment of secondary heat exchanger 24, a first (input) core cap 84 is affixed to first (input) core end 58 to form input manifold 62. Similarly, a second (output) core cap 86 is affixed to second (output) core end 60 to form output manifold 64. Fluid input and output ports 66 and 70 are typically formed through input and output core caps 84 and 86, respectively. However, those skilled in the art will appreciate that ports 66 and 70 may be formed through core 26 proximate core ends 58 and 60 to meet the requirements of specific configurations.

In the fabrication of a single-ended embodiment of secondary heat exchanger 24 (FIG. 2), a first (i/o) core cap 84 and a divider 88 are affixed to first (i/o) core end 58 to form both input manifold 62 and output manifold 64. Divider 88 partitions the inside surface of core cap 84 into an input portion 90 and an output portion 92. Similarly, divider 88 partitions i/o core end 58 into an input portion 94 and an output portion 96. Divider 88 itself has an input portion 98 and an output portion 100. Input manifold 62 is formed of the space encompassed by cap, end, and divider input portions 90, 94, and 98. Likewise, output manifold 64 is formed of the space encompassed by cap, end, and divider output portions 92, 96, and 100. A second (inter-chamber) core cap 86 is affixed to second (inter-chamber) core end 60 to form inter-chamber manifold 72. Fluid input and output ports 66 and 70 are typically formed through i/o core cap 84 and into input and output manifolds 62 and 64, respectively.

Those skilled in the art will appreciate that the configuration of divider 88 may assume any shape required to fulfill the task of partitioning core cap 84 and core end 58 to form input manifold 62 and output manifold 64. The use of a straight member for divider 88 is depicted in FIG. 2 for purposes of simplicity only.

Figure 3:
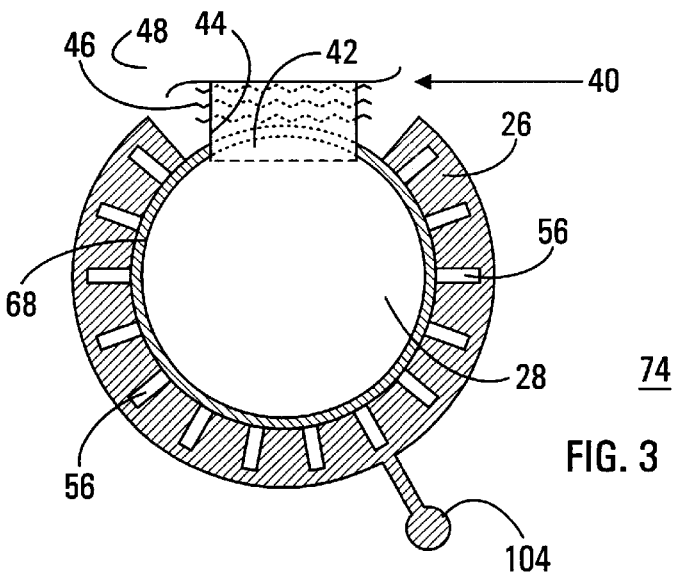
FIG. 3 depicts a cross-sectional view of a thermal-transfer unit formed with an extruded thermal-transfer core external to a thermal-transfer tank in accordance with a preferred embodiment of the present invention.

FIG. 3 depicts a cross-sectional view of thermal-transfer unit 74 formed with thermal-transfer core 26 external to thermal-transfer tank 28. In this embodiment, thermal-transfer unit 74 is formed by extruding thermal-transfer core 26 and bonding it to the exterior of an independently fabricated thermal-transfer tank 28. This produces a strong, integrated, and easily fabricated thermal-transfer unit 74.

Longitudinal chambers 56 are depicted in FIG. 3 as having a portion of their inner surface formed by an exterior surface of tank wall 68. This feature is by no means a requirement. Longitudinal chambers 56 may also be fully formed within the body of core 26.

In single-ended embodiments of secondary heat exchanger 24, divider 88 (FIG. 2) may be positioned at first end 80 of core 26 so that longitudinal chambers 56 having approximately one-half the total cross-sectional area of all longitudinal chambers 56 are configured to pass secondary fluid 52 in the forward direction through core 26, with the remaining longitudinal chambers 56 being configured to pass secondary fluid 52 in the reverse direction.

Figure 4:
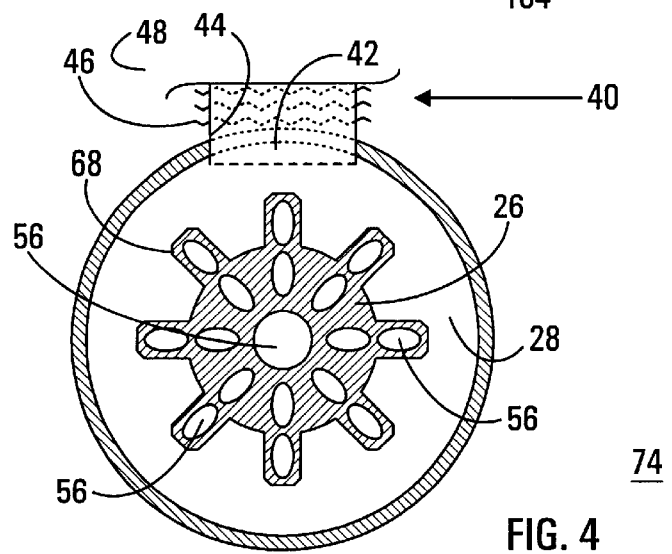
FIG. 4 depicts a cross-sectional view of a thermal-transfer unit formed with an extruded thermal-transfer core internal to a thermal-transfer tank in accordance with an alternative preferred embodiment of the present invention.

FIG. 4 depicts a cross-sectional view of thermal-transfer unit 74 formed of extruded thermal-transfer core 26 internal to primary-exchanger tank 28. In this embodiment, thermal-transfer unit 74 is formed by extruding thermal-transfer core 26 and bonding it within an independently fabricated cylindroidal or prismoidal thermal-transfer tank 28. Those skilled in the art will appreciate that core 26 may be bonded within tank 28 by a number of well-known means, including but not limited to extruded-in flanges, tabs, and tank and/or core end caps.

A central longitudinal chamber 56 is depicted in FIG. 4 as having a greater cross-sectional area than other longitudinal chambers 56. The intent here is to illustrate that one or more longitudinal chambers 56 may be configured, in any embodiment, to function primarily as a "return" for secondary fluid 52 in single-ended embodiments of secondary heat exchanger 24. In the depiction of FIG. 4, the central longitudinal chamber 56 would be partitioned from the other longitudinal chambers 56 at i/o end 58 by a cylindrical divider 88 (not shown). Those skilled in the art will appreciate that the depiction shown in FIG. 4 is not a requirement of the present invention.

Figure 5:
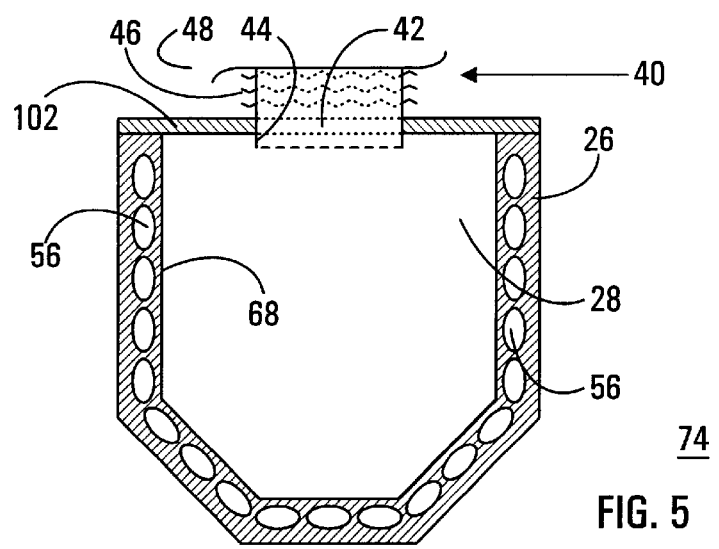
FIG. 5 depicts a cross-sectional view of a thermal-transfer unit formed of an integrally extruded thermal-transfer core and tank in accordance with an alternative preferred embodiment of the present invention.

FIG. 5 depicts a cross-sectional view of thermal-transfer unit 74 formed of an integrally extruded thermal-transfer core 26 and tank 28. In this embodiment, core 26 and tank 28 are extruded together as one piece. This offers a further reduction in fabrication costs and an increase in ease of assembly.

In FIG. 5, a mounting plate 102 is used to join primary-exchanger core 40 to tank 28. Mounting plate 102 is depicted for illustrative purposes only, and those skilled in the art will appreciate that this represents but one of myriad methods of coupling core 40 and tank 28.

In the preferred fabrication of thermal-transfer unit 74, thermal-transfer core 26 is fabricated of an extruded metal. Through the use of extrusion, a strong, lightweight, and rigid core 26 or any desired cross-section and length is readily achieved.

The transfer of heat 32 from secondary fluid 52 to primary fluid 34 is directly related to the inter-fluid interface area of thermal-transfer unit 74. That is, for a given conductivity, the ability of heat 32 to pass through tank wall 68 is a direct function of the area of the surface in contact with secondary fluid 52 (the secondary-fluid interface) and the area of the surface in contacts with primary fluid 34 (the primary-fluid interface). The use of extrusion allows the secondary-fluid interface and, in the embodiment of FIG. 5, the primary-fluid interface to be convoluted so as to significantly increase the interface areas over other fabrication techniques. This in turn allows the fabrication of a smaller thermal-transfer unit 74 for a given transfer of heat 32.

The transfer of heat 32 from secondary fluid 52 to primary fluid 34 is also directly related to the thermal conductivity of the materials from which thermal-transfer core 26 is extruded and thermal-transfer tank 28 is produced. In other words, the higher the thermal conductivity of core 26 and tank 28, the better heat 32 can transfer from secondary fluid 52 into primary fluid 34. For this reason, core 26 is desirably extruded of an aluminiferous or cupriferous metal.

Throughout this discussion indication has been made that thermal-transfer core 26 is formed of an extruded metal and bonded to thermal-transfer tank 28 to form thermal-transfer unit 74. Any of a number of bonding methods well-known to those skilled in the art may be used.

It is desirable that the bond between core 26 and tank 28 be strong and reliable. Since dissimilar metals experience differing thermal expansion, the use of dissimilar materials may produce a bond that will suffer thermal stresses and weaken over time. For this reason, it is desirous that tank 28 be of the same material as core 28, i.e., of the same aluminiferous or cupriferous material.

Additionally, a galvanic reaction may occur where dissimilar metals are bonded together. This galvanic reaction often leads to corrosion and eventual failure of the bond. For this reason, too, it is desirous that tank 28 be of the same material as core 26.

Non-metallic bonding agents, e.g., gaskets, seals, glues, caulks, etc., in many cases may provide sufficient flexibility to preclude thermal stress between core 26 and tank 28, as well as provide an insulating barrier inhibiting galvanic reactions. Such agents, however, are typically less durable that metals, having intrinsically lower strength and durability and exhibiting thermally and environmentally induced instabilities. Thus, it is desirous that the bond between core 26 and tank 28 be a metallic bond, such as welding, brazing, soldering, etc.

Additionally, the use of seals, gaskets, etc., is typically associated with the use of fasteners, e.g., screws, rivets, etc., to hold the parts together and hold the seals, gaskets, etc. in place. This in turn produces a more complex assembly, with a corresponding increase in expense. Again, it is desirous that the bond between core 26 and tank 28 be a metallic bond.

Divider 88 and core end caps 84 and 86 are affixed to ends 58 and 60 of thermal-transfer core 26. For the same reasons discussed above between core 26 and tank 28, it is desirous that these secondary components be formed of substantially the same materials as core 26 to inhibit thermal stresses and permit ease of assembly. Divider 88 and core end caps 84 and 86 may themselves be formed by stamping, casting, or other techniques well known to those skilled in the art.

Secondary-fluid ports 66 and 70 are formed in core end caps 84 and/or 86, or in core 26 itself. The process of forming ports 66 and 70 may entail the production of simple holes, threaded holes, the bonding of short tubes, or any other construct required to suit the specific application. If a component is affixed to cap 84, cap 86, or core 26, it is desirous that that component also be formed of substantially the same material as the part to which it is affixed.

Similarly, tank end caps 80 and 82 are affixed to ends 76 and 78 of thermal-transfer tank 28, and primary-fluid ports 38 and 50 formed in conjunction therewith. It is also desirous that these secondary components be formed of substantially the same material as the part to which it is affixed.

In the preferred embodiment, oven brazing is the bonding method of choice. Oven brazing is easily accomplished when the components to be bonded are formed of a cupriferous metal. When the components to be bonded are formed of an aluminiferous metal, they may be clad with a brazing alloy (not shown) to facilitate oven brazing. For example, an aluminiferous-metal core 26 may readily be brazed to a cupriferous metal tank 28 if core 26 is first clad with a suitable brazing alloy. Cladding is well known to those skilled in the art.

Oven brazing is an especially effective bonding method in that the whole of dual-fluid heat-exchanging system 20 may be assembled and bonded at one time, thus effecting an inexpensive fabrication thereof.

Additionally, components other than secondary-exchanger (thermal-transfer) core 26 may be formed by extrusion. Specifically, primary-exchanger output (thermal-transfer) tank 28 may be independently extruded and bonded with core 26 (FIGS. 3 and 4) or may be extruded as a part with core 26 (FIG. 5). Similarly, primary-exchanger input tank 30 may also be extruded. The advantages of extrusion for tanks 28 and 30 are ease of component fabrication, ease of assembly for system 20, and the ability to have identically extruded components for heat-exchanging systems 20 of varying capacities, wherein the extruded components vary only in length.

The use of extrusion potentially simplifies installation of heat-exchanging system 20 in that mounting rails 104 (FIG. 3) may be extruded as a part with secondary-exchanger core 26, primary-exchanger output tank 28, and/or primary-exchanger input tank 30. The use of such mounting rails may eliminate the need for additional brackets or other mounting components.

In summary, the present invention teaches a dual-fluid heat-exchanging system 20 with a thermal-transfer core 26 extruded from a cupriferous or aluminiferous metal. The use of an extruded core 26 offers a significantly larger interface area between primary and secondary fluids 34 and 52 than conventional systems, with a corresponding increase in the transfer of heat 32.

The present invention also teaches a simplified fabrication methodology for system 20 that eliminates seals, gaskets, etc., between components of primary and secondary heat exchangers 22 and 24 with a corresponding decrease in fabrication expenses.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for the fabrication of a thermal-transfer unit for a dual-fluid heat-exchanging system, wherein said method comprises:

extruding a metal core for a secondary heat exchanger of said dual-fluid heat-exchanging system;

producing a metal tank for a primary heat exchanger of said dual-fluid heat-exchanging system; and gasketlessly metallically bonding said secondary-exchanger core to said primary-exchanger tank to produce said thermal-transfer unit.

2. A fabrication method as claimed in claim 1 wherein said extruding activity extrudes said secondary-exchanger core from an aluminiferous metal.

3. A fabrication method as claimed in claim 2 wherein said method additionally comprises cladding said secondary-exchanger core with a brazing alloy.

4. A fabrication method as claimed in claim 1 wherein said extruding activity extrudes said secondary-exchanger core from a cupriferous metal.

5. A fabrication method as claimed in claim 1 wherein said bonding activity comprises combining said secondary-exchanger core and said primary-exchanger tank by brazing.

6. A fabrication method as claimed in claim 1 wherein said extruding activity extrudes a mounting rail as a part of said secondary-exchanger core.

7. A fabrication method as claimed in claim 1 wherein said producing activity comprises:

affixing a first tank cap to a tank wall of said primary-exchanger tank at a first end of said primary-exchanger tank;

affixing a second tank cap to said tank wall at a second end of said primary-exchanger tank; and forming a primary-fluid port in one of said tank wall, said first tank cap, and said second tank cap.

8. A fabrication method as claimed in claim 1 wherein:

said extruding activity comprises forming a longitudinal chamber from a first end to a second end of said secondary-exchanger core; and said method additionally comprises:
      affixing a first core cap to said first core end;
      affixing a second core cap to said second core end;
      forming a first secondary-fluid port proximate said first core end; and
      forming a second secondary-fluid port proximate said second core end.

9. A fabrication method as claimed in claim 1 wherein:

said extruding activity comprises forming a plurality of longitudinal chambers from a first end to a second end of said secondary-exchanger core; and said method additionally comprises:
      affixing a divider to said first core end to partition said first core end into a first core-end portion and a second core-end portion;

affixing a first core cap to said first core end and said divider;

affixing a second core cap to said second core end;

forming a first secondary-fluid port proximate said first core-end portion; and forming a second secondary-fluid port proximate said second core-end portion.

10. A fabrication method as claimed in claim 1 additionally comprising:

affixing first and second core caps to first and second ends of said secondary-exchanger core;

affixing first and second tank caps to a wall of said primary-exchanger tank at first and second ends of said primary-exchanger tank;

fabricating said secondary-exchanger core, said primary-exchanger tank wall, said first and second core caps, and said first and second tank caps of one of an aluminiferous metal clad with a brazing alloy and a cupriferous metal;

affixing said first and second core caps to said secondary-exchanger core by brazing;

affixing said first and second tank caps to said primary-exchanger tank wall by brazing; and combining said secondary-exchanger core and said primary-exchanger tank into said thermal-transfer unit by brazing.

11. A fabrication method as claimed in claim 1 wherein said metallically bonding activity bonds said core to said tank by one of welding, brazing, and soldering.

* * * * *